Feb. 10, 1970  G. MOHRING  3,495,051
CURRENT COLLECTOR ASSEMBLY FOR ELECTRIC DRIVE VEHICLES
Filed March 4, 1968  2 Sheets-Sheet 1
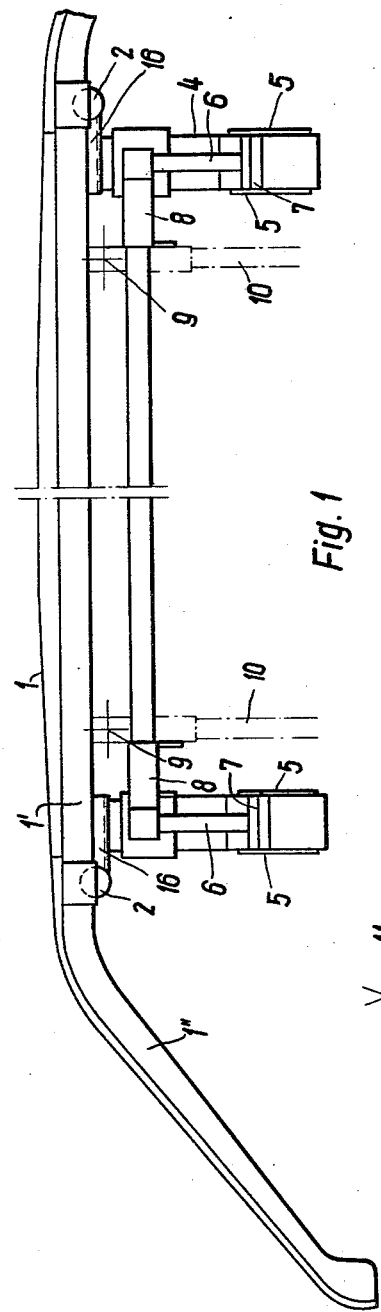
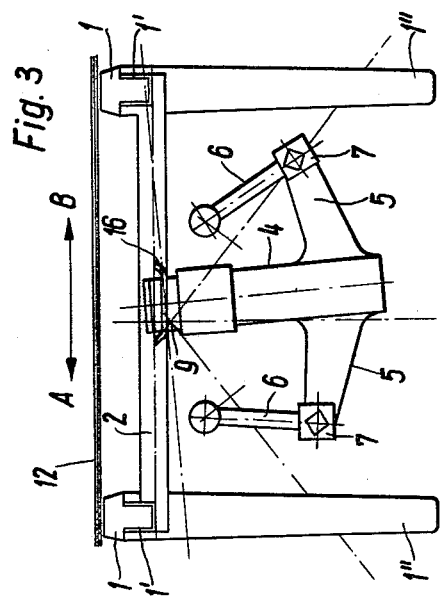
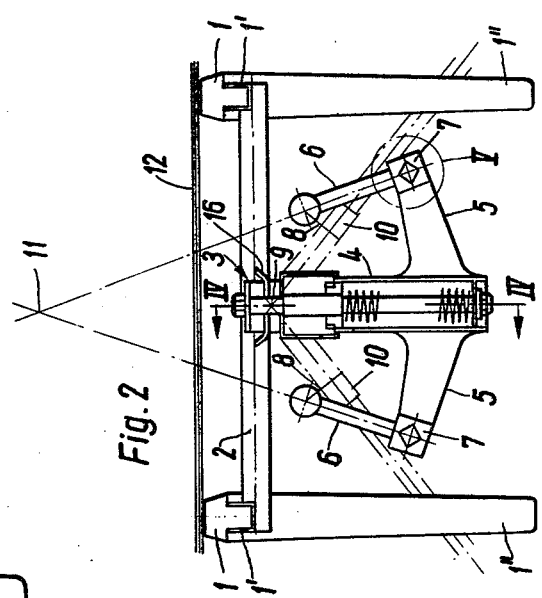
Inventor:
Gerhard MÖHRING
by: Arthur O. Klein
his Attorney Feb. 10, 1970  G. MOHRING  3,495,051
CURRENT COLLECTOR ASSEMBLY FOR ELECTRIC DRIVE VEHICLES
Filed March 4, 1968  2 Sheets-Sheet 2
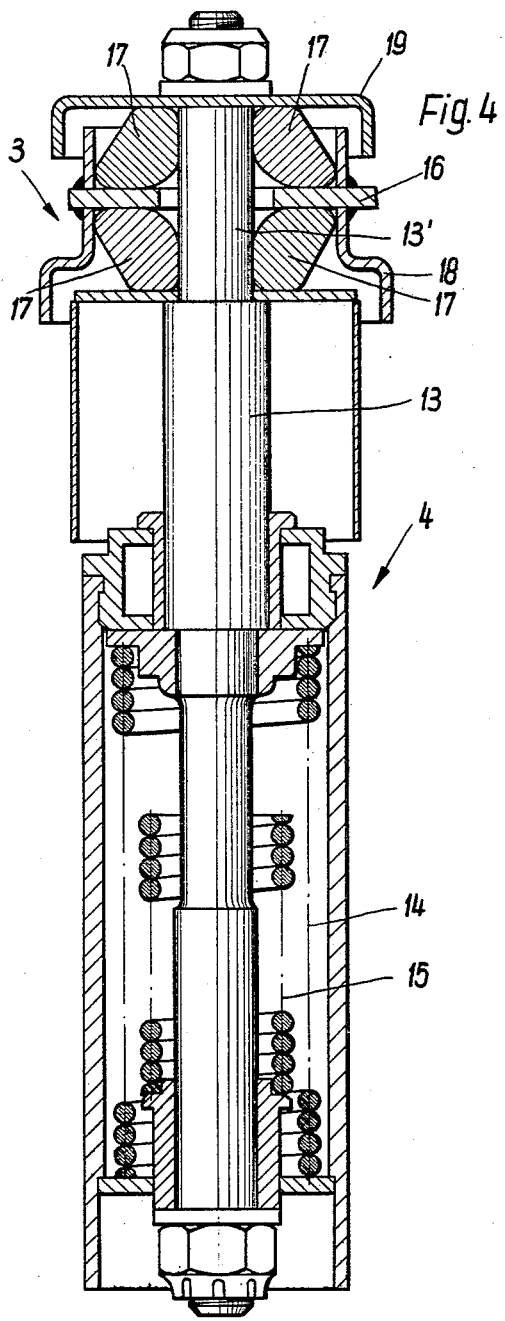
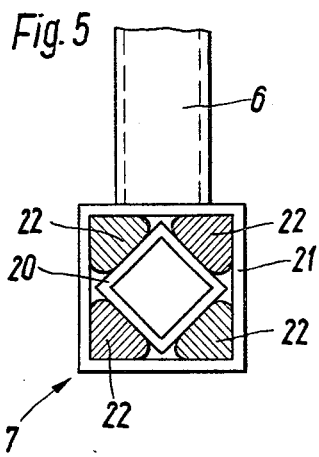
Inventor:
Gerhard MÖHRING
by: Arthur O. Klein
his Attorney

United States Patent Office 3,495,051
Patented Feb. 10, 1970

3,495,051
CURRENT COLLECTOR ASSEMBLY FOR
ELECTRIC DRIVE VEHICLES
Gerhard Mohring, Schuttorf, Germany, assignor to
Firma August Stemmann o.H.G., Schuttorf,
Germany
Filed Mar. 4, 1968, Ser. No. 710,001
Claims priority, application Germany, Jan. 27, 1968,
St 27,811
Int. Cl. B60l 5/00, 5/12, 5/10
U.S. Cl. 191—45                                8 Claims

ABSTRACT OF THE DISCLOSURE

A current collecting assembly for an electrically operated driving vehicle. The assembly includes a frame which has a pair of opposed lateral portions and which includes a pair of parallel collector bars which slidably engage the trolley wire. These opposed portions of the frame are operatively connected with a pair of elastic compensating means which in turn are connected to top ends of a pair of telescopic spring means. A pair of guide rod means are operatively connected to each telescopic spring means and are carried by the lazy-tong, pantograph linkage which has a top vertex end situated lower than the trolley wire. The guide rod means are located beyond this top vertex end of the linkage and are connected to each telescopic spring means by a pair of torsion spring means, respectively. With this construction during movement of the collector bars along the trolley wire with one of these bars leading the other the tendency of the leading bar to engage the wire with greater friction and pressure and for the trailing bar to have the pressure of its engagement with the trolley wire reduced is opposed by the action of the guide rod means, torsion spring means, and telescopic spring means on the compensating means, the latter being stressed in such a way as to urge the trailing collector bar toward and the leading collector bar away from the trolley wire so as to maintain these bars in uniform engagement with the trolley wire even at high vehicle speeds.

BACKGROUND OF THE INVENTION

The invention relates to current collectors for electrically operated driving vehicles.

In particular, the invention relates to that type of current collector which includes a frame which in part is made up of two or more parallel collector bars which slidably engage a trolley wire. Current collectors of this type are used particularly with lazy-tongs, pantograph linkages situated on top of the vehicle and coacting with the frame for raising it to the elevation where the collector bars will engage the trolley wire. Arrangements of this type are well known in connection with vehicles which are to be electrically driven, but they also are used in other known constructions of current collectors.

Conventional structures of this latter type are incapable of assuring proper running engagement between the current collector and trolley wire at high vehicle speeds of more than approximately 140 km./h. Actual experience and tests have shown that at speeds of this latter order, as a result of aerodynamic pressures and eddy currents, tilting of the current collector head takes place. As a result of these aerodynamic forces the collector bar which leads in the direction of vehicle travel presses against the trolley wire in such a way that the collector bar which trails in the direction of travel is displaced away from the trolley wire. As a result the entire functioning of the current collector and the required contact with the trolley wire becomes unreliable. Thus, the trailing collector bar "flutters" with respect to the trolley wire in a manner which while undesirable could not, up to the present time, be avoided.

It has already been proposed to alleviate this problem by a structure such as that shown in German Patent 1,219,511. Thus, with the structure of this latter type the frame which forms a rib structure with the parallel collector bars is suspended at at least four points spaced from the upper vertex point of the pantograph linkage and is mounted for free springy movement in all directions in such a way that the frame is suspended on four swingable telescopic spring assemblies carried by the upper part of the pantograph linkage. The swingable telescopic spring assemblies have axes which intersect each other at or above the trolley wire. Thus, with this type of known current collector assembly there is a differential suspension capable of absorbing thrusts which act vertically as well as horizontally and thus preventing displacement of the trailing collector bar from the trolley wire even at relatively high vehicle speeds.

However, experience has shown that with this latter known construction under certain operating conditions with respect to the trolley wire and at relatively high speeds of over 180 km./h., it is still not possible to achieve a fully reliable operation.

SUMMARY OF THE INVENTION

It is thus a primary object of the present invention to provide a construction of the above general type which will avoid the above drawbacks.

In particular, it is an object of the invention to provide for a current collector assembly a suspension structure which will reliably maintain proper contact between the collector bars and trolley wire even at speeds greater than 180 km./h.

Also, it is an object of the invention to provide a structure capable of achieving this result at the above high speeds even under unfavorable operating conditions and conditions with respect to the trolley wire, as for example, where a fixedly positioned trolley wire coacts simultaneously with a plurality of current collectors of each unit.

In particular, it is an object of the invention to provide a structure which will automatically respond to the particular speed of movement of the vehicle to oppose the tendency of a leading collector bar to press with a greater force against the trolley wire and the tendency of a trailing trolley bar to have its pressure of engagement with the trolley wire reduced, in such a way that the structure of the invention will automatically urge the trailing collector bar toward the trolley wire and the leading collector bar away from the trolley wire with forces which will uniformly maintain the collector bars in proper sliding contact with the trolley wire at all operating speeds, even relatively high speeds on the order referred to above, and under all operating conditions.

In accordance with the invention the current collector assembly has a frame which includes at least a pair of parallel collector bars for slidably engaging a trolley wire, this frame having a pair of opposed lateral portions respectively connected to a pair of elastic compensating means which are in turn respectively connected to the tops ends of a pair of telescopic spring means which extend downwardly from the pair of elastic compensating means, respectively, and which have vertical rest positions, respectively. A lazy-tong pantograph linkage means has a top vertex point lower than the trolley wire, and a pair of guide rod means which are carried by the linkage means are operatively connected to each telescopic spring means through a pair of torsion spring means respectively connected to at least one of the ends of the pair of guide rod means. In this way the assembly is supported on the linkage means. The pair of guide rod means connected to each telescopic spring means are situated at a location spaced beyond the top vertex point of the linkage means and each pair of guide rod means has a pair of axes which intersect at an elevation higher than the trolley wire.

This structure of the invention will reliably absorb thrusts in vertical as well as horizontal directions and will also act to prevent displacement of the trailing collector bar away from the trolley wire even at relatively high vehicle speeds.

BRIEF DESCRIPTION OF DRAWINGS

The invention is illustrated by way of example in the accompanying drawings which form part of this application and in which:

FIG. 1 is a partly schematic fragmentary transverse elevation of a current collector assembly of the invention as seen when the assembly travels toward the viewer;

FIG. 2 is a partly sectional and schematic side view of the current collector assembly of FIG. 1 shown in a rest position in engagement with a trolley wire;

FIG. 3 illustrates an operating condition of the parts of FIG. 2;

FIG. 4 is a longitudinal sectional elevation of a telescopic spring means and elastic compensating means of the invention, both of these means having a common axis and the plane of FIG. 2 containing this latter axis; and FIG. 5 is a fragmentary sectional illustration of the structure shown in the dot-dash line circle V of FIG. 2, at an enlarged scale as compared to FIG. 2.

DESCRIPTION OF A PREFERRED EMBODIMENT

The current collector assembly illustrated in FIGS. 1–3 includes a pair of parallel collector bars 1 having downwardly projecting connecting portions 1' and provided with lateral downwardly inclined end tips 1" for engaging, under extreme conditions, tunnel walls or the like. These collector bars 1 extend transversely of the direction of travel of the vehicle and have their connecting portions 1' interconnected by tubular frame members 2 which extend in the direction of travel and form a frame with the collector bars 1. This frame 1, 2 has midway between the bars 1 a pair of opposed lateral portions operatively connected with a pair of elastic compensating means 3 which are respectively connected to the top ends of a pair of telescopic spring means 4 which extend vertically in their rest positions, as shown for the spring means 4 of FIG. 2. Each telescopic spring means 4 is provided with a pair of symmetrically extending arms 5 which provide the spring means 4 with a fork-shaped configuration, these arms 5 extending respectively forwardly and rearwardly with respect to the direction of vehicle travel. At their outer ends the arms 5 of the telescopic spring means 4 are operatively connected with a pair of guide rod means 6, so that such a pair of guide rod means 6 are operatively connected to each telescopic spring means 4. The arms 5 are respectively connected to the lower ends of each pair of guide rod means 6 where a torsion spring means 7 is interposed between the connection of the arms 5 with the guide rod means 6, respectively. The pair of guide rod means 6 at one side of the assembly are respectively interconnected with the pair of guide rod means 6 at the other side of the assembly by a pair of elongated horizontally extending bars 8 which are fixed to the top ends of the guide rod means 6. The entire structure is supported by a lazy-tong pantograph linkage means 10 having a pair of upper and pivotally interconnected limbs which intersect at the top vertex point 9 of this linkage means, and the transversely extending portions 8 of the guide rod means 6 directly rest on the upper components of the linkage 10 in the manner shown in FIG. 2. Thus, the upper pivotally interconnected limbs which intersect at the point 9 directly support the guide rod means 6 which it will be noted are situated beyond the top vertex point 9 of the linkage means 10. Moreover, the axes of each pair of guide rod means 6 intersect at a point 11 situated at an elevation higher than the trolley wire 12.

Referring to FIG. 4, which is taken along line IV—IV of FIG. 2 in the direction of the arrows, it will be seen that each telescopic spring means 4, which in and of itself may be conventional, includes a central elongated rod 13 surrounded by coil springs 14 and 15 which operate sequentially in response to downward pressure on the rod 13 for providing the telescopic spring means with a progressive characteristic. As has already been pointed out, the frame 1, 2 has opposed lateral portions each of which is connected with the elastic compensating means 3 which is connected to the top end of the telescopic spring means 4. For this purpose each tubular frame member 2 fixedly carried midway between the bars 1 a plate 16 formed with an opening passing therethrough, this plate 16 being, for example, welded to each frame member 2. The upper end portion of the rod 13 of each telescopic spring means 4 extends with considerable clearance through the opening of the plate 16. Each elastic compensating means 3 includes rubber, elastic components 17 between which the plate 16 is located so that the plate 16 is elastically gripped and held between the components 17 of the elastic compensating means 3. Because of the considerable play of the telescopic spring means 4 with respect to the plate 16 it is possible for the compensating means 3 to compensate for one-sided or non-uniform loading of the frame 1, 2 so that in this way there is no tendency for the telescopic spring means 4 to tilt as a result of such one-sided or non-uniform loading. The rubber, elastic components 17 of the compensating means 3 engage housing components 18 and 19 which serve to substantially completely enclose the components 17. The housing part 18 includes cylindrical ring-shaped members welded to the upper and lower faces of the plate 16 while the part 19 has the form of an inverted cup carried by the top end of the rod 13 and surrounding the top edge of housing component 18 with clearance. The lower edge of the housing component 18 surrounds the top end of the housing of the telescopic spring means 4 with clearance, this latter housing engaging the lower components 17 in the manner shown in FIG. 4. In this way the frame 1, 2 at its portions 16 is supported by the pair of elastic compensating means 3 which include the rubber spring elements 17 which provide the compensating action, with the pair of compensating means situated at the top ends of the telescopic spring means 4, respectively, so that this structure also operates to provide a vertically acting springy support for the current collector assembly of the invention.

FIG. 5 illustrates the lower supporting end of a guide rod means 6, this structure being duplicated at the lower end of each guide rod means 6. A torsion spring means 7 is provided at the connection between each guide rod means 6 and the arm 5 of the telescopic spring means 4 to which it is connected. As is apparent from FIG. 1 each arm 5 has a forked construction in that it is provided with a pair of spaced parallel walls between which the torsion spring means 7 is located. The pair of plates which provide each arm 5 with its forked construction are fixed to an elongated member 20 of square cross section which extends between and is fixed at its outer ends to the plates which form each arm 5. Displaced by 90° with respect to and surrounding the inner member 20 is an outer member 21 also of square cross section, and this member 21 has an upper wall directly fixed to the guide rod means 6. Between the members 20 and 21 are the rubber springy components 22 which constitute with elements 20 and 21 the torsion spring means 7 interconnecting each guide rod means 6 with an arm 5.

Of course, the invention is not limited to the particular constructive details described above and shown in the drawing. The invention resides in the principle according to which the current collector assembly is supported and suspended, while the details of the structure, in particular those of FIGS. 4 and 5, can of course take other suitable forms. Thus, it is not essential to use the structure of the invention with a lazy-tong, pantograph linkage means, and instead the current collector assembly can also be used with other installations. Furthermore, more than two collector bars 1 can be provided. It is also possible to locate the torsion spring means 7 for the guide rod means 6 at the upper ends thereof, and in addition it is possible to use torsion bars instead of the structure shown in FIG. 5 and described above. The manner in which the structure of the invention operates, as described below, is in no way influenced by such variations in the details of the structure.

The above-described support and suspension for the current collector assembly makes it unnecessary to provide an additional straight guiding structure which serves only to hold the current collector against the trolley wire and which is for the most part undesirable during operation. The pair of telescopic spring means 4 which carry the pair of elastic compensating means 3 and which through the latter support the frame 1, 2 make it possible to provide a highly effective vertically acting springy support for the frame 1, 2 opposing the vibrating frequency of the trolley wire 12 when the current collector slides beneath the latter at high speed, and the pair of compensating means 3 prevent tilting of the pair of telescopic spring means 4 even if there is a one-sided or non-uniform loading of the frame 1, 2.

On the other hand, the frictional engagement of the collector bars 1 with the trolley wire 12 and the aerodynamic pressure which increases with increasing speed provide forces tending to shift the current collector assembly, and these forces are taken up and absorbed by the suspension provided by way of the telescopic spring means 4 and guide rod means 6 as well as by the arrangement and support thereof in such a way that loading thrusts acting longitudinally of the trolley wire and the different pressures resulting from the different aerodynamic moments at the individual current collector bars 1 are automatically compensated. The structure of the invention operates as follows:

In FIG. 2 where the structure is shown at rest the pair of telescopic spring means 4 extend vertically down from the pair of compensating means 3. On the other hand, in FIG. 3 the structure is assumed to be traveling in the direction of the arrow A so that the forces which are enecountered thereby tend to shift the structure rearwardly in the direction of the arrow B, at the same time tending to tilt the entire assembly about the point 11. As a result the torsion spring means 7 of the several guide rod means 6 are turned and stressed at the connections thereof to the arms 5 of the telescopic spring means 4. As a result of this change in the position of the frame 1, 2 at the upper end of the pair of telescopic spring means 4, the effective spring pressure at the pair of compensating means 3, also changes, so that as a result of the tendency of the frame 1, 2 to assume an inclined position, the pressure at the leading bar 1 is reduced and the pressure at the trailing bar 1 is increased, this trailing bar 1 being thus urged with a greater force toward the trolley wire while the force with which the leading bar 1 tends to press against the trolley wire is reduced. The shifting and swinging of the pair of telescopic spring means 4 provide automatically reciprocal spring forces in the pair of compensating means 3 and in the telescopic spring means 4 itself, so that they act in opposition to the increased pressure with which the leading bar 1 tends to engage the trolley wire at high vehicle speeds and compensate for this latter tendency toward an increased pressure between the leading bar 1 and the trolley wire. The forces which shift the assembly rearwardly during forward travel thereof have a magnitude depending upon the speed of the vehicle and act in opposition to the steady restoring forces of the torsion spring means 7 on the guide rod means 6, these restoring forces continuously adapting themselves to the particular rearward shifting forces. Thus, a perfect running and reliable contact of the current collector assembly at the trolley wire is assured even at high speeds of over 180 km./h. and under undesirable operating and trolley wire conditions as for example where a fixed trolley wire is simultaneously engaged by a plurality of current collectors of each unit.

A particular advantage of the invention resides in the fact that the desired operation is achieved with a system which responds in a stable, reliable manner in its entirety and which permits the data required to design and construct the assembly to be calculated.

Thus, the pair of telescopic spring means 4 which are connected at their top ends to the pair of compensating means can, as a result of their suspension on the guide rod means, not only swing, but also they can shift in opposition to the direction of travel, to an increasing degree with increased speeds, so that the frame 1, 2 which is elastically supported at the pair of compensating means 3 at the top ends of the pair of telescopic spring means 4 can change its position for reducing the pressure between the leading bar 1 and the trolley wire, while at the same time increasing the pressure between the trailing bar 1 and the trolley wire. Furthermore, the clearance of the rods 13 in the openings of the plates 16 permit the pair of compensating means 3 to prevent tilting of the telescopic spring means 4 as a result of one-sided or non-uniform loading of the frame 1, 2. Thus, in all operating positions there wil be a continuous fully reliable vertical springy support for the frame 1, 2, and this factor is of particularly great significance at speeds of over 180 km./h (for example 250 km./h.), and under conditions where the trolley wire has a fixed mounting.

What is claimed is:

1. In a current collector assembly for an electric driving vehicle, a frame having a pair of opposed lateral portions and including at least two parallel collecting bars for slidably engaging a trolley wire, a pair of elastic compensating means connected to said lateral portions of said frame, respectively, a pair of telescopic spring means connected to and extending downwardly from said compensating means, respectively, and said pair of telescopic spring means having vertical rest positions, a lazy-tong, pantograph linkage means having a top vertex situated at an elevation lower than the trolley wire, a pair of elongated guide rod means carried by said linkage means and operatively connected to each telescopic spring means for supporting the latter, said pair of guide rod means connected to each telescopic spring means being situated beyond said top vertex of said linkage means and respectively having axes which intersect each other at an elevation higher than said trolley wire, and torsion spring means operatively connected to at least one end of each guide rod means for resiliently resisting turning thereof, whereby said guide rod means serve as a suspension for said frame and pair of elastic compensating means through said pair of telescopic spring means to each of which a pair of said guide rod means are operatively connected, and said pair of compensating means, telescopic spring means, and plurality of guide rod means acting during movement of the vehicle to maintain said collecting bars uniformly pressing against said trolley wire.

2. The combination of claim 1 and wherein each telescopic spring means includes a pair of symmetrical arms extending therefrom, and said pair of guide rod means connected to each telescopic spring means respectively having lower ends operatively connected with said arms, said torsion spring means being respectively situated at the lower ends of said guide rod means where they are connected to said arms, respectively.

3. The combination of claim 1 and wherein each compensating means and torsion spring means includes rubber spring elements.

4. The combination of claim 1 and wherein each telescopic spring means includes a pair of symmetrical arms extending therefrom and having a forked configuration, said pair of guide rod means which is operatively connected to each telescopic spring means respectively having lower ends connected to said arms, and said torsion spring means being interposed between the lower ends of said guide rod means and said arms, respectively.

5. The combination of claim 4 and wherein each telescopic spring means has a progressive spring characteristic.

6. The combination of claim 1 and wherein said pair of elastic compensating means respectively connected to the upper ends of said telescopic spring means and to said lateral portions of said frame have with respect to the latter a sufficiently great play in all directions to provide for maintenance of proper alignment of said pair of telescopic spring means even under conditions where said frame is loaded on only one side or is loaded in a non-uniform manner.

7. The combination of claim 6 and wherein each of said lateral portions of said frame includes a substantially horizontal plate fixed to said frame and formed with an opening passing therethrough, said pair of telescopic spring means respectively including rods extending with substantially great clearance through said openings of said plates, and each elastic compensating means including an elastic member situated above said plate and an elastic member situated below said plate with both of said elastic members operatively engaging said telescopic spring means to provide for a relatively great range of tilting of the latter with respect to said plate.

8. The combination of claim 1 and wherein said collector bars extend transversely of the trolley wire with one of said bars leading and the other of said bars trailing when the vehicle moves in a given direction, said lateral portions of said frame being situated substantially midway between said collector bars and the latter by frictional engagement with the trolley wire during movement of the vehicle tending to shift rearwardly in a direction opposed to the direction of vehicle travel so that said plurality of torsion spring means which act on said guide rod means become stressed to tilt each telescopic spring means to which a pair of said guide rod means are connected in a direction where each telescopic spring means has a lower end situated rearwardly in the direction of travel with respect to its upper end to provide through each telescopic spring means a stressing of said elastic compensating means connected to the upper end thereof and each elastic compensating means when thus stressed urging the trailing collector bar upwardly toward the trolley wire and the leading trolley bar downwardly away from the trolley wire in a manner precisely compensating for the tendency of the leading collector bar to increase its pressure against the trolley wire and the tendency of the trailing collector bar to have its pressure of engagement with the trolley wire reduced.

References Cited

UNITED STATES PATENTS

| 1,253,661 | 1/1918 | Aalborg | 191—55 |
| 3,106,272 | 10/1963 | Mohring | 191—68 |

FOREIGN PATENTS

| 1,190,022 | 4/1965 | Germany. |

ARTHUR L. LA POINT, Primary Examiner

CHARLES B. LYON, Assistant Examiner

U.S. Cl. X.R.

104—120; 191—68